United States Patent [19]
Wilger et al.

[11] Patent Number: 4,682,631
[45] Date of Patent: Jul. 28, 1987

[54] SEALING APPARATUS FOR A VALVE BODY OPENING

[75] Inventors: John F. Wilger, Honolulu; Stephen Orillo, Jr., Mililani Town; Gregory S. Nakano, Pearl City, all of Hi.

[73] Assignee: The United States of America as represented by the Secretary of the Navy, Washington, D.C.

[21] Appl. No.: 848,422

[22] Filed: Apr. 3, 1986

[51] Int. Cl.$^4$ .............................................. F16L 55/12
[52] U.S. Cl. ........................................ 138/94; 138/89
[58] Field of Search .................... 138/89, 94; 251/158, 251/194; 137/315, 317

[56] References Cited

U.S. PATENT DOCUMENTS

| | | | |
|---|---|---|---|
| 3,130,951 | 4/1964 | Smith | 138/94 X |
| 3,543,802 | 12/1970 | Leopold et al. | 138/94 |
| 4,285,368 | 8/1981 | Teppill et al. | 138/89 |
| 4,408,636 | 10/1983 | Karpenko | 138/94 |

Primary Examiner—James E. Bryant, III
Attorney, Agent, or Firm—Robert F. Beers; Ervin F. Johnston

[57] ABSTRACT

An apparatus is provided for sealing the pressure side opening of a gate valve body which includes a pair of plates and a device for joining the plates for lateral and pivotal movements with respect to one another. A device is associated with the outside edge of one of the plates for engaging the nonpressure side of the gate valve and another device is associated with the outside edge of the other plate for sealing the pressure side opening of the gate valve. Each plate has a top camming surface and a bottom camming surface with the top camming surfaces of the plates being angled toward one another and the bottom camming surfaces of the plates being angled toward one another. A device engages the top and bottom camming surfaces of the plates for laterally spreading the plates so that the sealing device can be forced into sealing engagement with the pressure side opening of the gate valve body.

18 Claims, 5 Drawing Figures

SEALING APPARATUS FOR A VALVE BODY OPENING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to an apparatus for sealably closing a gate valve body or pipe opening which may or may not be under pressure.

Steam powered plants whether they may be nuclear, coal, or oil burning, require periodic overhaul. These plants characteristically include a boiler, piping, and gate valves in the piping. When the movable part of a gate valve is removed from the valve body for refurbishment of the parts the openings in the valve body should be sealed to prevent contamination of the remainder of the system. In the past this sealing operation has been accomplished by O-ring assemblies. These assemblies have not been satisfactory because of the close tolerances which are required to make a strong seal. Out-of-round and pitted interior surfaces of the waterways compound the problem. In some steam powered plants working pressures from 250-300 p.s.i. must be implemented during the overhaul which require a strong and effective seal in the pressure waterway, such as in the gate valve body.

SUMMARY OF THE INVENTION

The present invention provides an apparatus for effectively and efficiently sealing the pressure side opening of a gate valve body. This is accomplished by providing a pair of plates and a device for joining the plates for lateral and pivotal movements with respect to one another. Another device is associated with the outside edge of one of the plates for engaging the nonpressure side of the gate valve, and still another device is associated with the outside edge of the other plate for sealing the pressure side opening of the gate valve. Each plate has a top camming surface and a bottom camming surface wherein the top camming surfaces of the plates are angled toward one another and the bottom camming surfaces of the plates are also angled toward one another. A further device engages the top and bottom camming surfaces of the plates for laterally spreading them so that the sealing device can be forced into sealing engagement with the pressure side opening of the gate valve body. With the invention out of round and/or pitted waterways can be effectively sealed to withstand working pressures applied within the waterways during overhaul of the steam powered plant.

OBJECTS OF THE INVENTION

An object of the invention is to overcome problems associated with the aforementioned prior art O-ring device for sealing waterways.

Another object is to provide an apparatus for efficiently and effectively sealing the pressure side opening of a waterway, such as the pressure side opening of a gate valve body.

A further object is to provide an apparatus for sealing the pressure side opening of a waterway even though the interior surface of the waterway adjacent the opening may be out of round and/or pitted.

Still another object is to provide an apparatus as set forth in the preceding paragraph wherein working pressures, such as 300 p.s.i. are applied within the waterway.

Other objects, advantages and novel features of the invention will become apparent from the following detailed description of the invention when considered in conjunction with the accompanying drawings.

DESCRIPTION OF THE PREFERRED EMBODIMENT

Figure 4:
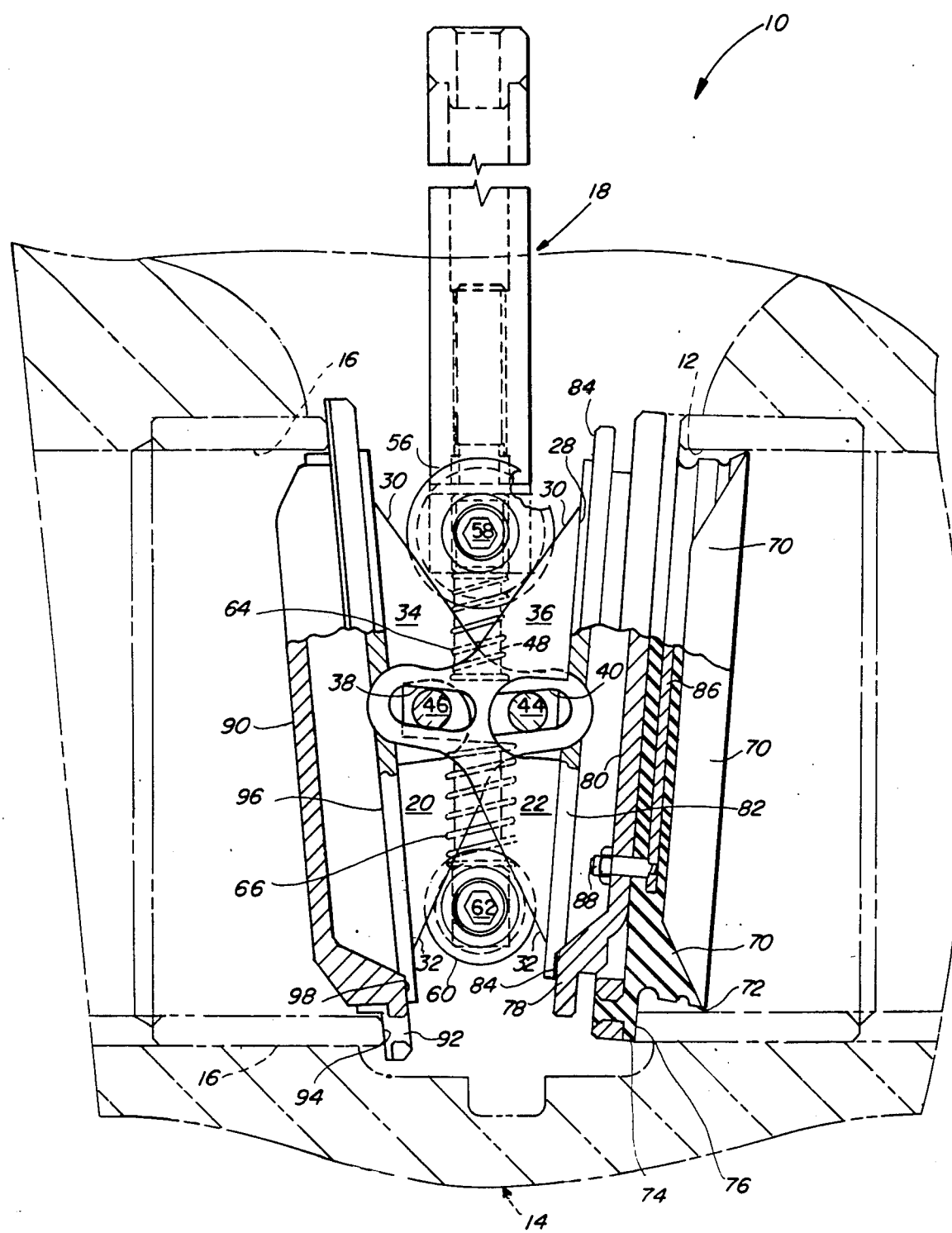
FIG. 4 is a side view of the sealing apparatus in a relaxed unsealed condition within the openings of a gate valve body, the latter being shown in phantom.

Referring now to the drawings wherein like reference numerals designate like or similar parts throughout the several views there is illustrated in FIG. 4 an apparatus 10 for sealing a waterway opening such as the pressure side opening 12 of a gate valve body 14. The gate valve body 14 has had the internal movable portion removed so as to expose the pressure side opening 12 as well as a nonpressure side opening 16.

Figure 1:
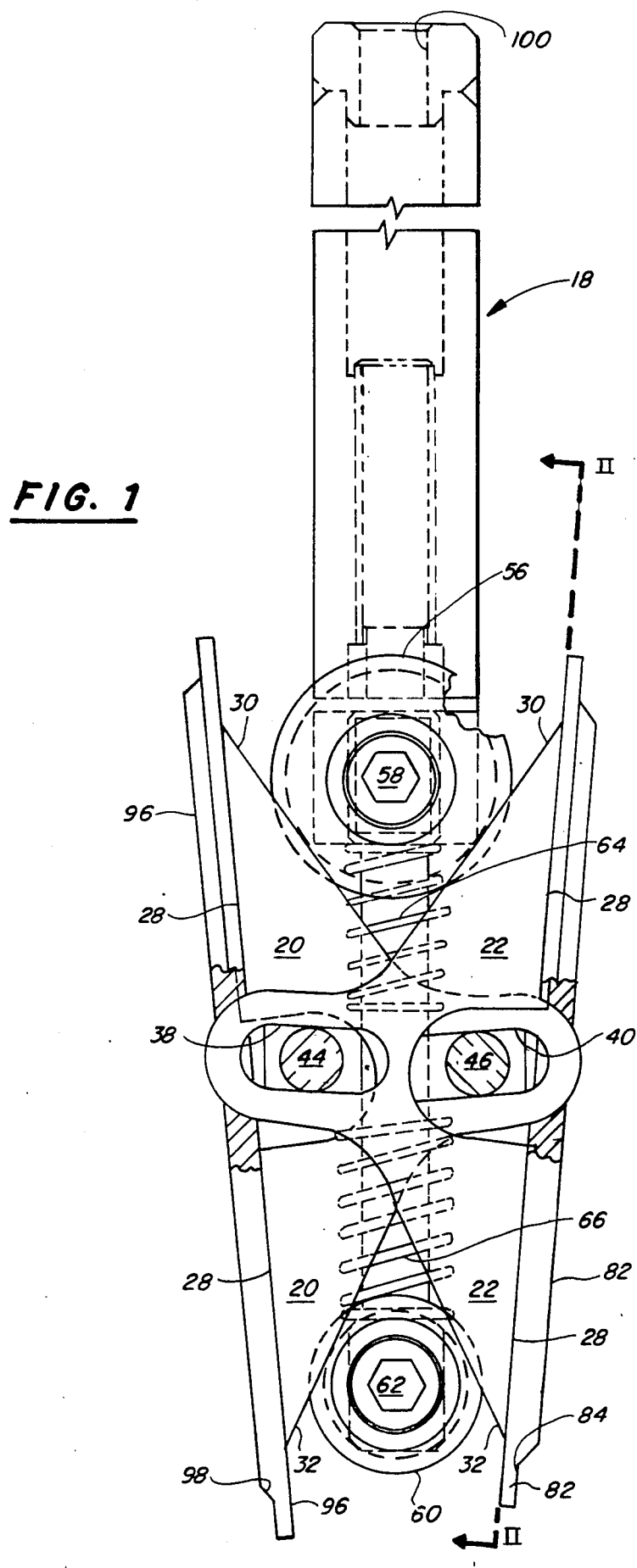
FIG. 1 is a side view of the movable portion of the waterway sealing apparatus.
Figure 2:
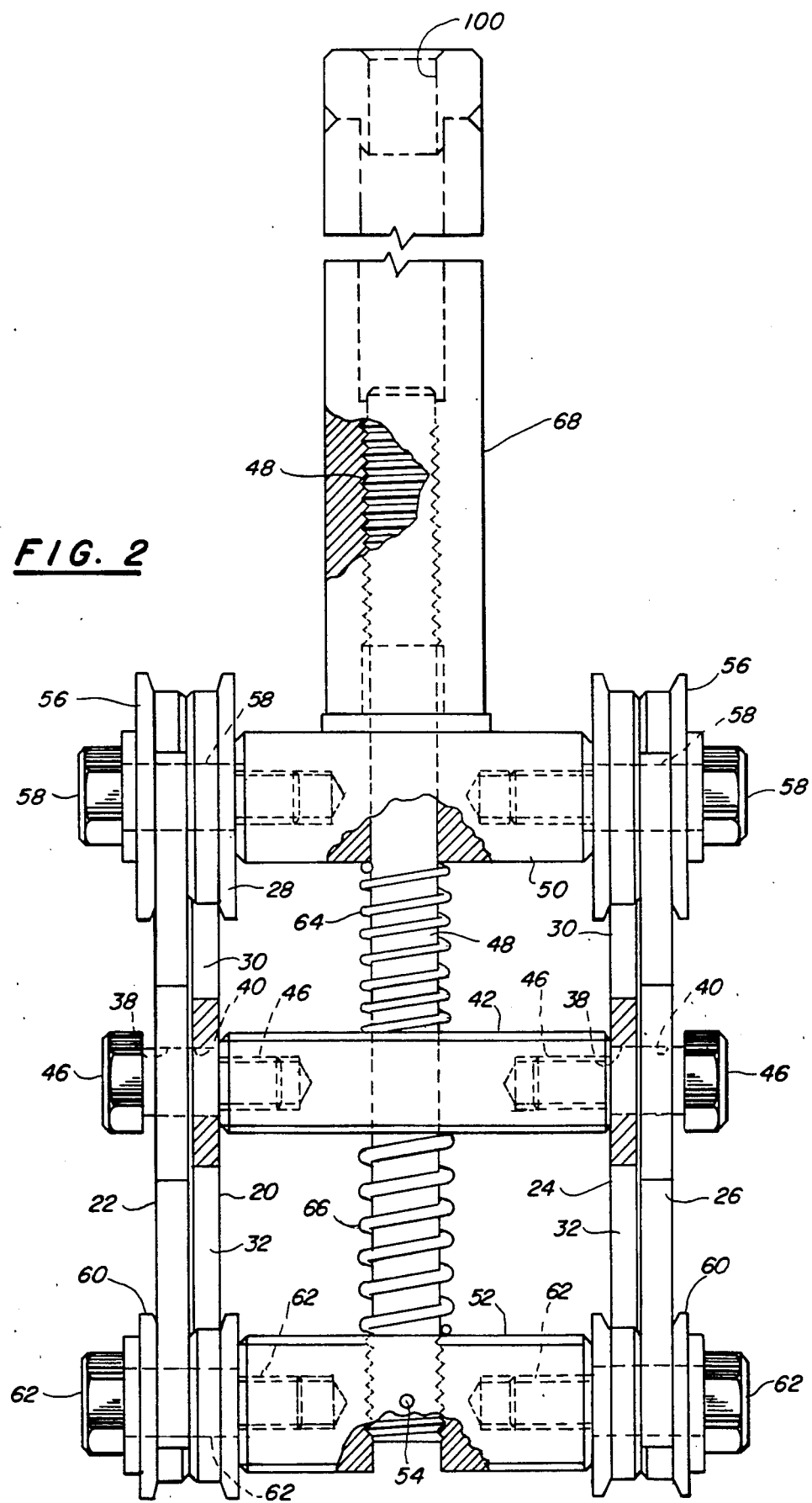
FIG. 2 is a view taken along plane II—II of FIG. 1.

In FIG. 1 there is illustrated the movable portion 18 of the sealing apparatus. As illustrated in FIGS. 1 and 2 the movable portion includes a pair of plates 20 and 22 and another pair of plates 24 and 26 with means, which will be described in detail hereinafter, for joining the plates for lateral and pivotal movements with respect to one another. Each of the plates has an outside edge 28. Means, which will be described in detail hereinafter, associated with the outside edges 28 of the plates 20 and 24 engages the nonpressure side 16 of the gate valve body 14, and means, which will be described in detail hereinafter, is associated with the outside edges 28 of the other plates 22 and 26 for sealing the pressure side opening 12 of the gate valve body 14.

Each plate has a top camming surface 30 and a bottom camming surface 32, the top camming surfaces of each pair of plates being angled toward one another and the bottom camming surfaces 32 of each pair of plates also being angled toward one another. Means, which will be described in detail hereinafter, are provided for engaging the top and bottom camming surfaces 30 and 32 of the pairs of plates for laterally spreading each pair of plates toward the openings 12 and 16 of the gate valve body 14. With this arrangement, sealing means, which will be described hereinafter, can be forced into sealing engagement with the pressure side opening 12 of the gate valve body 14.

The joining means, referred to hereinabove, may include the nonpressure side plate 20 and the pressure side plate 22 each having a laterally extending slot 38 and 40, respectively, and the other pair of side plates 24 and 26 having laterally extending slots 38 and 40, respectively, as seen in FIG. 2. As illustrated in FIG. 2, a block 42 may laterally extend between the pair of plates 20 and 22 on one side and the pair of plates 24 and 26 on the other side. A pair of pins 44 and 46 may be mounted on one end of the block 42 in a laterally spaced relationship with each pin 44 and 46 extending through a respective one of the slots 38 and 40 of the plates 20 and 22. In a similar manner another pair of pins, one of the pins 46 being illustrated on the right in FIG. 2, are mounted on an opposite side of the block 42 in a laterally spaced relationship, each of these pins extending through a respective one of the slots 38 and 40 of the plates 24 and 26.

The spreading means, referred to hereinabove, may include a rod 48 which slidably extends through the lateral block 42. The spreading means may further include second and third lateral blocks 50 and 52, the second lateral block 50 being located above the lateral block 42 and the third lateral block 52 being located below the lateral block 42. The rod 48 may slidably extend through the lateral block 50 and may be fixed to the lateral block 52 by any suitable means, such as being threaded therein and secured by a pin 54. A pair of top rollers 56 may be pivoted to the lateral block 50 by pins 58 and a pair of bottom rollers 60 may be pivoted to the lateral plate 52 by pins 62, the top and bottom rollers 56 and 60 engaging the top and bottom camming surfaces 30 and 32, respectively, of both pairs of plates.

The spreading means may further include top and bottom coil springs 64 and 66 which are located about the rod 48, the top spring 64 being located between the top and middle lateral blocks 50 and 42 and the bottom spring 66 being located between the bottom and middle blocks 52 and 42. An elongated nut 68 may be threaded on the rod 48 above the top lateral block 50. The bottom of the nut 68 may engage the top of the lateral block 50 so that when the nut 68 is threaded down on the rod 48 the nut drives the top lateral block 50 toward the bottom lateral block 52. When the lateral blocks 50 and 52 are driven toward one another the top and bottom rollers 56 and 60, acting upon the camming surfaces 30 and 32, respectively, will cause the nonpressure and pressure side plates 20 and 22 and the other pair of nonpressure and pressure side plates 24 and 26 to be spread outwardly toward the gate valve body openings 16 and 12.

Figure 5:
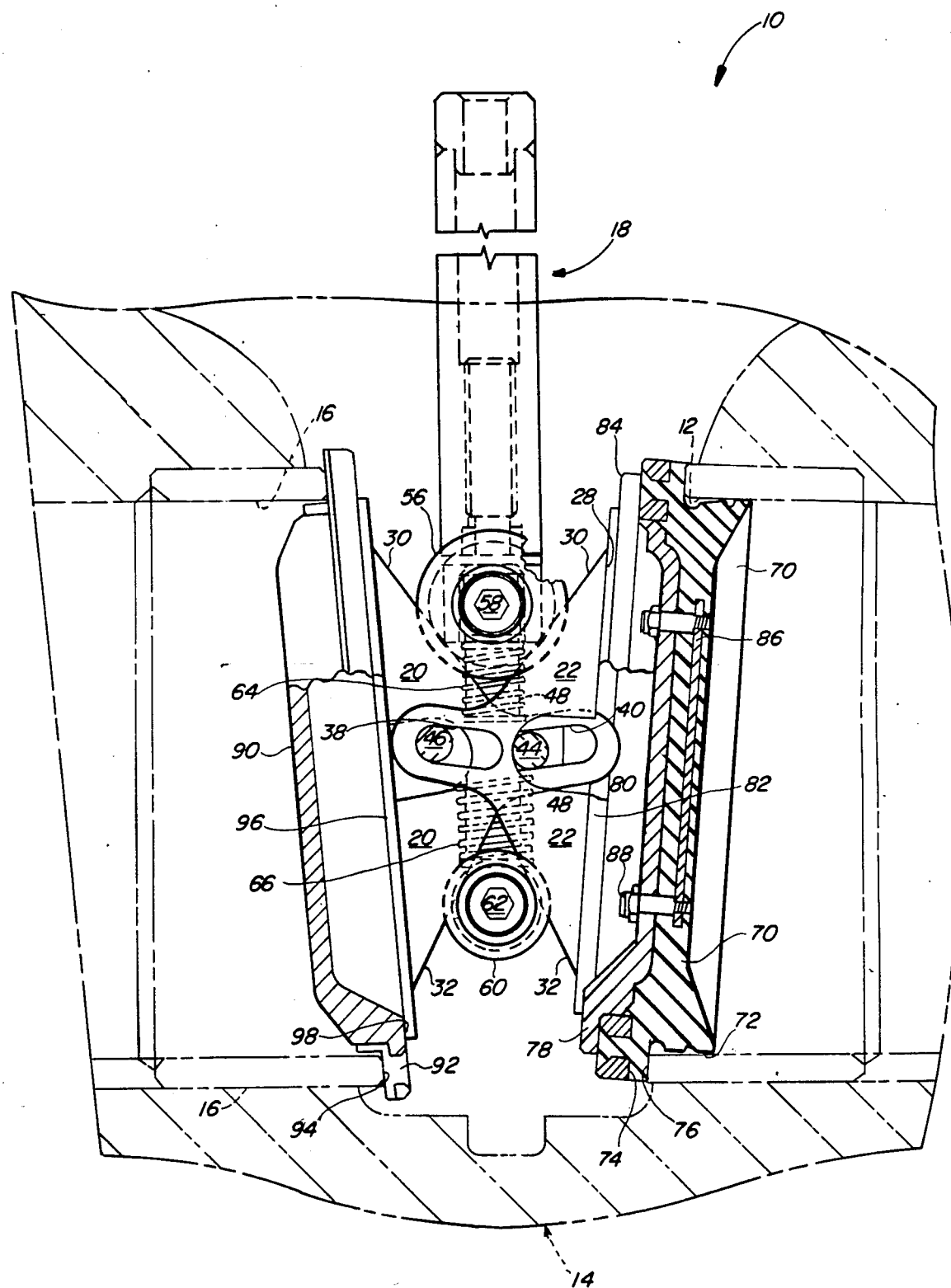
FIG. 5 is similar to FIG. 4 except the sealing apparatus has been expanded to seal the pressure side opening of the gate valve body, the latter being shown in phantom.

The sealing means, referred to hereinabove, may further include a resilient cup 70 (see FIG. 3) which is adapted to fit end first into the pressure side opening 12 of the gate valve. The resilient cup 70, which may be made of Buna rubber, may have an annular top edge 72 which is expandable to seal against the interior wall adjacent to the pressure side opening 12 of the gate valve. In the relaxed condition the cup 70 may be spaced from this wall, as illustrated in FIG. 4, and when expanded to seal against the wall it will appear as shown in FIG. 5. The expansion and relaxation of the cup is caused by the extension and retraction of the pair of plates 20 and 22 and the pair of plates 24 and 26. The resilient cup 70 may be provided with an annular resilient flange 74 about its bottom end. The annular resilient flange 74 is adapted to engage an outside edge 76 of the pressure side opening 12 of the gate valve body 14.

The sealing means may further include a rigid cup 78 which faces in an opposite direction from the resilient cup 70 so that the bottom of the rigid cup engages the bottom of the resilient cup along plane 80. An annular member 82 may be fixed to the outside edges 28 of the pressure side plates 22 and 26 for engaging a top annular edge 84 of the rigid cup 78. The annular member 82 and the rigid cup 78 are preferably separable so that the resilient cup 70 can be mounted within the opening 12 before insertion of the movable part 18 of the sealing apparatus. The bottom of the rigid cup 78 is preferably fixed to the bottom of the resilient cup 70 by any suitable means such as epoxy or a plate 86 embedded in the resilient plate 70, which resilient plate may be attached to the rigid plate 78 by bolt and nut combinations 88.

The engaging means, referred to hereinabove, may include a rigid cup 90 which is adapted to fit bottom first into the nonpressure side opening 16 of the gate valve body 14. The top of the rigid cup 90 may be provided with an annular outwardly extending resilient edge 92 for sealably engaging the outer edge 94 of the nonpressure side opening 16. This resilient edge 92 may be an annular Buna rubber ring which has projections which forceably fit through openings in the flanged edge of the rigid plate 90. An annular member 96 is fixed to the outside edges 28 of the nonpressure side plates 20 and 24 for engaging the top of the rigid cup 90 at 98. The annular member 96 and the rigid cup 90 are preferably separable so that the rigid cup 90 can be inserted within the nonpressure side opening 16 prior to insertion of the movable portion 18 of the sealing apparatus.

The top of the nut 68 may be provided with a square opening 100 for the insertion of a square extension of a ratchet (not shown) so that the nut can be easily turned to extend and retract the pair of plates 20 and 22 and the pair of plates 24 and 26.

OPERATION OF THE INVENTION

Figure 3:
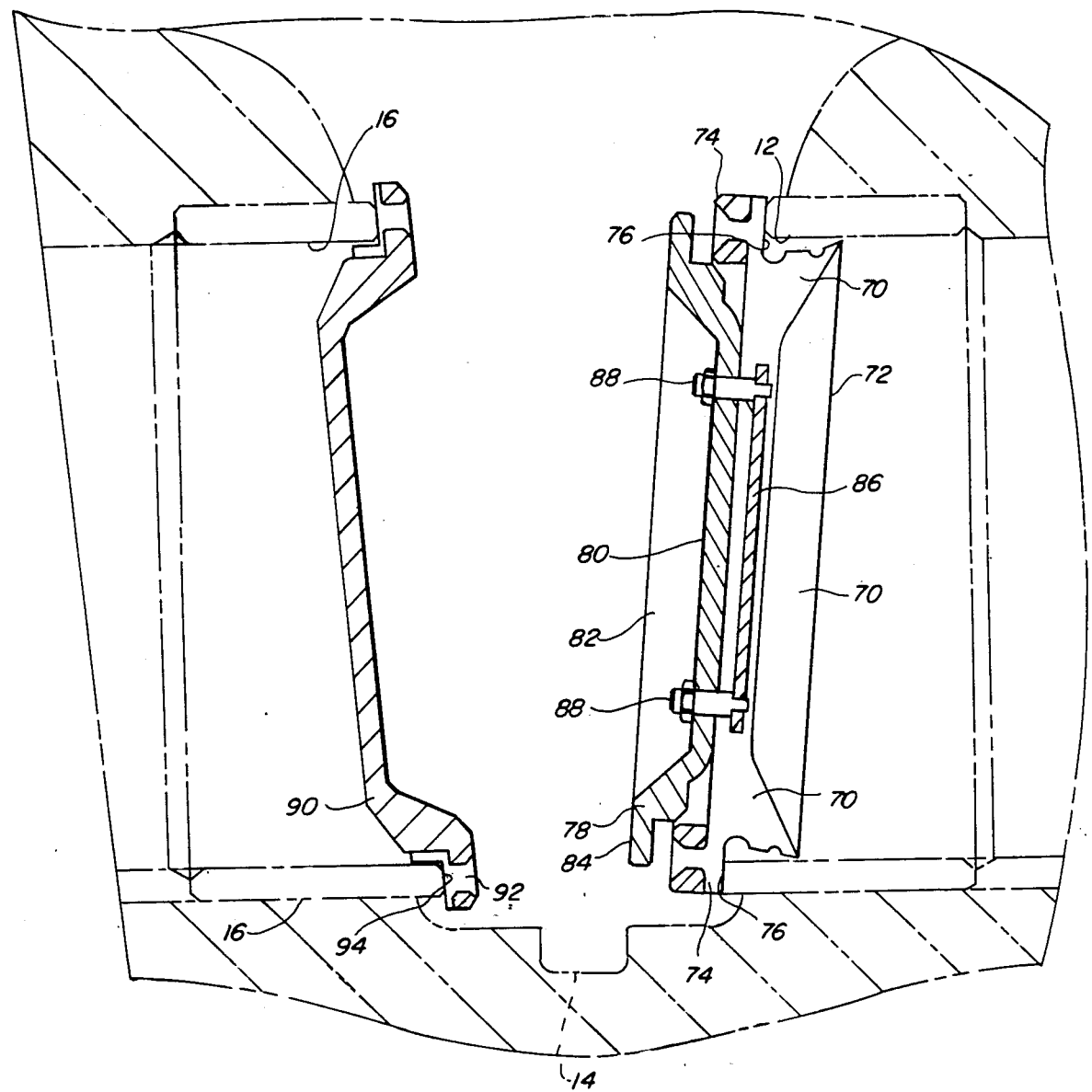
FIG. 3 is a cross sectional side view the stationary portions of the waterway sealing apparatus shown in place within pressure and nonpressure side openings of a gate valve body, the latter being shown in phantom.

In the operation of the invention the resilient plate 70 is inserted within the pressure side opening 12 of the gate valve body 14 with the resilient flange 74 seated against the annular valve edge 76, as shown in FIG. 3. The rigid plate 90 is inserted within the nonpressure side opening 16 with the resilient ring 92 positioned against the annular edge 94. As shown in FIG. 4, the movable portion 18 of the sealing apparatus is then inserted into the opening of the gate valve body 14 so that the annular member 82 engages the top edge 84 of the rigid plate 78 and the annular ring 96 engages the top edge 98 of the rigid plate 90. At this point the resilient cup 70 is in its relaxed condition, as illustrated in FIG. 4. The nut 68 is then turned clockwise to cause the rollers 56 and 60 to be driven toward one another which causes the pair of plates 20 and 22 and the pair of plates 24 and 26 to be extended outwardly in a lateral direction. As shown is FIG. 5, the extension of the latter plates causes the rigid plate 78 to push on the bottom of the resilient cup 70 to expand its edge 72 until it makes sealing engagement with the inside surface of the pressure opening 12. It is important to note that the arrangement of the movable portion 18 of the sealing apparatus allows the pair of plates 20 and 22 and the pair of plates 24 and 26 to seek its own fulcrum point by sliding along the longitudinal axis of the rod 48. This is caused by the slidable engagement, described hereinabove, between the middle lateral block 42 and the rod 48. Further, the slotted openings 38 and 40 in the pair of plates 20 and 22 and the pair of plates 24 and 26 allow these pair of plates to float while maintaining alignment. The sliding action of the lateral plate 42, the springs 64 and 66, and the lateral slots 38 and 40 enable the rollers 56 and 60 to maintain uniform pressures against the camming surfaces 30 and 32 of the pair of plates 20 and 22 and the pair of plates 24 and 26. After assembly of the sealing apparatus pressure can be applied within the piping system upstream from the pressure side opening 12 of the gate valve body which will further cause the resilient cup 70 to make an even tighter sealing engagement with the inside surface of the pressure side opening 12. To remove the sealing apparatus the nut 68 need simply to be turned in a counterclockwise direction to cause the pair of plates 20 and 22 and the pair of plates 24 and 26 to retract inwardly and release pressure on the rigid plates 78 and 96 until such time that the movable portion 18 can be removed from the gate valve body 14. The resilient cup 70 with its rigid plate 78 and the rigid plate 90 are then removed from the openings 12 and 16 so that the movable portion (not shown) of the gate valve can then be reassembled into the gate valve body 14.

Obviously many modifications and variations of the present invention are possible in the light of the above teachings. It is therefore to be understood that within the scope of the appended claims the invention may be practiced otherwise than as specifically described.

What is claimed is:

1. An apparatus for sealing the pressure side opening of a gate valve body comprising:
   a pair of plates;
   means joining the plates for lateral and pivotal movements with respect to one another;
   each of the plates having an outside edge;
   means associated with the outside edge of one of the plates for engaging the nonpressure side of the gate valve body;
   means associated with the outside edge of the other plate for sealing the pressure side opening of the gate valve body;
   each plate having a top camming surface and a bottom camming surface, the top camming surfaces of the plates being angled toward one another and the bottom camming surface of the plates being angled toward one another; and
   means engaging the top and bottom camming surfaces of the plates for laterally spreading the plates, whereby the sealing means can be forced into sealing engagement with the pressure side opening of the gate valve body.

2. A gate valve sealing apparatus as claimed in claim 1 wherein the joining means includes:
   the nonpressure side plate and the pressure side plate each having a laterally extending slot;
   a laterally extending block; and
   a pair of pins mounted on the block in a laterally spaced relationship, each pin extending through a respective one of said slots.

3. A gate valve sealing apparatus as claimed in claim 2 wherein the spreading means includes:
   a rod slidably extending through the lateral block.

4. A gate valve sealing apparatus as claimed in claim 3 wherein the spreading means further includes:
   second and third lateral blocks, the second lateral block being located above the first mentioned lateral block and the third lateral block being located below the first lateral block;
   the rod being fixed to the third lateral block and slidably extending through the second lateral block; and
   a top roller pivoted to the second lateral block and a bottom roller pivoted to the third lateral block, the top and bottom rollers engaging said top and bottom camming surfaces, respectively.

5. A gate valve sealing apparatus as claimed in claim 4 wherein the spreading means further includes:
   top and bottom coil springs about said rod, the top spring being located between the first and second blocks and the second spring being located between the second and third blocks.

6. A gate valve sealing apparatus as claimed in claim 5 wherein the spreading means further includes:
   said rod being threaded;
   a nut threaded on the rod above the second block and adapted to engage and drive the second block toward the third block to cause the rollers to outwardly extend the nonpressure and pressure side plates.

7. A gate valve sealing apparatus as claimed in claim 6 including:
   another pair of said nonpressure and pressure side plates located on an opposite side of the rod from the first pair;
   another pair of laterally spaced pins extending through the slots of the second pair of nonpressure and pressure side plates; and
   another pair of rollers pivoted to opposite sides of second and third blocks for engaging top and bottom camming surfaces of the second pair of nonpressure and pressure side plates.

8. A gate valve sealing apparatus as claimed in claim 1 wherein the sealing means includes:
   a resilient cup adapted to fit top end first into the pressure side opening of the gate valve body and having an annular top edge which is expandable to seal against the interior wall of the pressure side of gate valve body; and
   said cup having an annular flange about its bottom end which is adapted to engage an outside edge of the pressure side opening of the gate valve body.

9. A gate valve sealing apparatus as claimed in claim 8 wherein the sealing means further includes:
   a rigid cup facing in an opposite direction from the resilient cup so that the bottom of the rigid cup is adapted to engage the bottom of the resilient cup.

10. A gate valve sealing apparatus as claimed in claim 9 wherein the sealing means further includes:
    an annular member fixed to the outside edge of the pressure side plate for engaging a top annular edge of the rigid cup;
    the annular member and the rigid cup being separable; and
    the bottom of the rigid cup being fixed to the bottom of the resilient cup.

11. A gate valve sealing apparatus as claimed in claim 10 wherein the joining means includes:
    the nonpressure side plate and the pressure side plate each having a laterally extending slot;
    a laterally extending block; and
    a pair of pins mounted on the block in a laterally spaced relationship, each pin extending through a respective one of said slots.

12. A gate valve sealing apparatus as claimed in claim 11 wherein the joining means further includes:
    a rod slidably extending through the lateral block.

13. A gate valve sealing apparatus as claimed in claim 12 wherein the spreading means includes:
    second and third lateral blocks, the second lateral block being located above the first mentioned lateral block and the third lateral block being located below the first lateral block;

the rod being fixed to the third lateral block and slidably extending through the second lateral block; and a top roller pivoted to the second lateral block and a bottom roller pivoted to the third lateral block, the top and bottom rollers engaging said top and bottom camming surfaces respectively.

14. A gate valve sealing apparatus as claimed in claim 13 wherein the spreading means further includes:

top and bottom coil springs about said rod, the top spring being located between the first and second blocks and the second spring being located between the second and third blocks.

15. A gate valve sealing apparatus as claimed in claim 14 wherein the spreading means further includes:

said rod being threaded;

a nut threaded on the rod above the second block and adapted to engage and drive the second block toward the third block to cause the rollers to outwardly extend the nonpressure and pressure side plates.

16. A gate valve sealing apparatus as claimed in claim 15 including:

another pair of said nonpressure and pressure side plates located on an opposite side of the rod from the first pair;

another pair of said laterally spaced pins extending through the slots of the second pair of nonpressure and pressure side plates; and another pair of rollers pivoted to opposite sides of the second and third blocks for engaging top and bottom camming surfaces of the second pair of nonpressure and pressure side plates.

17. A gate valve sealing apparatus as claimed in claim 16 wherein the engaging means includes:

a rigid cup which is adapted to fit bottom first into the nonpressure side opening of the gate valve body;

the top of the rigid cup of the engaging means having an annular outwardly extending resilient edge for sealably engaging the outer edge of the nonpressure side opening of the gate valve body;

an annular member fixed to the outside edge of the nonpressure side plate for engaging the top of the rigid cup engaging means; and the latter annular member and the latter rigid cup being separable.

18. An apparatus for closing a gate valve after removal of the valve gate assembly to expose a valve cavity comprising:

a cup-shaped resilient seal which is adapted to fit into one opening within the valve cavity and having an annular rubber flange which is adapted to seal against an outer edge about said one opening;

a cup-shaped backing plate having its bottom secured to the outside bottom of the cup-shaped resilient seal;

a rigid locating plate which is adapted to fit into the opposite opening within the valve cavity and having an annular rubber ring which is adapted to seal against the outer edge about the opposite opening; and an expander assembly including:

a pair of pressure rings, one pressure ring adapted to engage the outer rim of the backing plate and the other pressure ring adapted to engage the locating plate;

two spaced pairs of pressure plates fixed to the pressure rings and pivoted by pins and spaced by a spacer bar, each pair of plates having top and bottom camming edges;

a threaded rod extending vertically between the pressure plates, and two pairs of rollers slidably mounted laterally on the shaft by spacer bars with the rollers of one pair riding the top camming edges and the rollers of the other pair riding the bottom camming edges;

a spring mounted on the rod between each roller spacer bar and the pressure plate spacer bar; and a nut threaded on the top of the rod and engageable with the top roller spacer bar to operate the whole expander assembly to expand against the backing and locating plates to in turn cause the cup-shaped rubbr seal to expand in and seal said one opening within the valve cavity.

* * * * *